(12) United States Patent
Hickey et al.

(10) Patent No.: US 7,713,649 B2
(45) Date of Patent: May 11, 2010

(54) FUEL CELL STACK WITH INTERNAL FUEL MANIFOLD CONFIGURATION

(75) Inventors: Darren Hickey, Palo Alto, CA (US); Matthias Gottmann, Sunnyvale, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 1044 days.

(21) Appl. No.: 11/276,717

(22) Filed: Mar. 10, 2006

(65) Prior Publication Data
US 2006/0204827 A1 Sep. 14, 2006

Related U.S. Application Data

(60) Provisional application No. 60/660,515, filed on Mar. 10, 2005.

(51) Int. Cl.
*H01M 2/14* (2006.01)
*H01M 8/10* (2006.01)
(52) U.S. Cl. .......................................... 429/39; 429/32
(58) Field of Classification Search .................. 429/12, 429/32, 34, 35, 36, 37, 38, 39
See application file for complete search history.

(56) References Cited

U.S. PATENT DOCUMENTS

| | | | |
|---|---|---|---|
| 3,935,028 A | 1/1976 | Strasser et al. | |
| 4,543,303 A | 9/1985 | Dantowitz et al. | |
| 4,708,916 A * | 11/1987 | Ogawa et al. | 429/38 |
| 5,543,240 A * | 8/1996 | Lee et al. | 429/38 |
| 6,251,534 B1 | 6/2001 | McElroy | |
| 6,623,880 B1 | 9/2003 | Geisbrecht et al. | |
| 6,653,008 B1 * | 11/2003 | Hirakata et al. | 429/26 |
| 6,854,688 B2 | 2/2005 | McElroy | |
| 2002/0058175 A1 | 5/2002 | Ruhl | |
| 2003/0180602 A1 | 9/2003 | Finn et al. | |
| 2005/0164051 A1 | 7/2005 | Venkataraman et al. | |

OTHER PUBLICATIONS

Shaffer, Steven, "Development Update on Delphi's Solid Oxide Fuel Cell System", 2004 SECA Review Meeting, 34 pgs., http://www.netl.doe.gov/publications/proceedings/04/seca-wrkshp/Delphi%20-%20Shaffer.pdf.
Zizelman, James et al., "Solid Oxide Fuel Cell Auxiliary Power Unit—A Development Update", SAE2002, World Congress, Mar. 4-7, 2002, SAE Technical Paper Series 2002-01-0411, 10 pgs.
U.S. Appl. No. 11/274,928, filed Nov. 16, 2005, Gottmann.

* cited by examiner

*Primary Examiner*—Dah-Wei D Yuan
*Assistant Examiner*—Stephan Essex
(74) *Attorney, Agent, or Firm*—Foley & Lardner LLP

(57) ABSTRACT

A fuel cell stack includes a plurality of fuel cells, and a plurality of fuel delivery ports. Each of the plurality of fuel delivery ports is positioned on or in the fuel cell stack to provide fuel to a portion of the plurality fuel cells in each stack.

14 Claims, 3 Drawing Sheets

US 7,713,649 B2

FUEL CELL STACK WITH INTERNAL FUEL MANIFOLD CONFIGURATION

This application claims benefit of priority of U.S. Provisional Application Ser. No. 60/660,515, filed on Mar. 10, 2005, which is incorporated herein by reference in its entirety.

BACKGROUND OF THE INVENTION

The present invention is generally directed to fuel cells and more specifically to fuel cell stack configuration.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide reversible fuel cells, that also allow reversed operation.

In a high temperature fuel cell system such as a solid oxide fuel cell (SOFC) system, an oxidizing flow is passed through the cathode side of the fuel cell while a fuel flow is passed through the anode side of the fuel cell. The oxidizing flow is typically air, while the fuel flow is typically a hydrogen-rich gas created by reforming a hydrocarbon fuel source. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack In other words, the gas flows through riser openings or holes in the supporting layer of each cell, such as the electrolyte layer, for example. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

BRIEF SUMMARY OF THE INVENTION

The preferred aspects of present invention provide a fuel cell stack, comprising a plurality of fuel cells, and a plurality of fuel delivery ports. Each of the plurality of fuel delivery ports is positioned on or in the fuel cell stack to provide fuel to a portion of the plurality fuel cells in each stack.

DETAILED DESCRIPTION OF THE PREFERRED EMBODIMENTS

The present inventors realized a novel approach to fuel cell stacks that are internally manifolded at least on the fuel side The fuel cells contain small (i.e., narrow or small diameter) fuel riser openings, such as openings having a cross sectional width of 0.5 inches or less, The benefits of a small internal fuel manifold include reduced material and fabrication cost, less failures in the electrolyte, larger available cross section for air flow, and increased active area.

The present inventors also realized that in a stack with internal manifolding on the fuel side having riser openings with a small cross sectional width, the pressure drop from the top to the bottom of the stack may be large which may limit stack height. In order to increase stack height, a plurality of fuel delivery ports may be positioned in or on the fuel cell stack to provide fuel to a portion of the fuel cells in each stack. The fuel delivery ports may be placed at periodic intervals up the stack feeding only a limited number of fuel cells. This configuration prevents or reduces large pressure differentials from developing that cause fuel flow non-uniformity. If desired, the fuel delivery ports may be connected to internal fuel manifolds (i.e., pipes or chambers having a plurality of openings for making connections) located between adjacent fuels cells of the stack.

Figure 1:
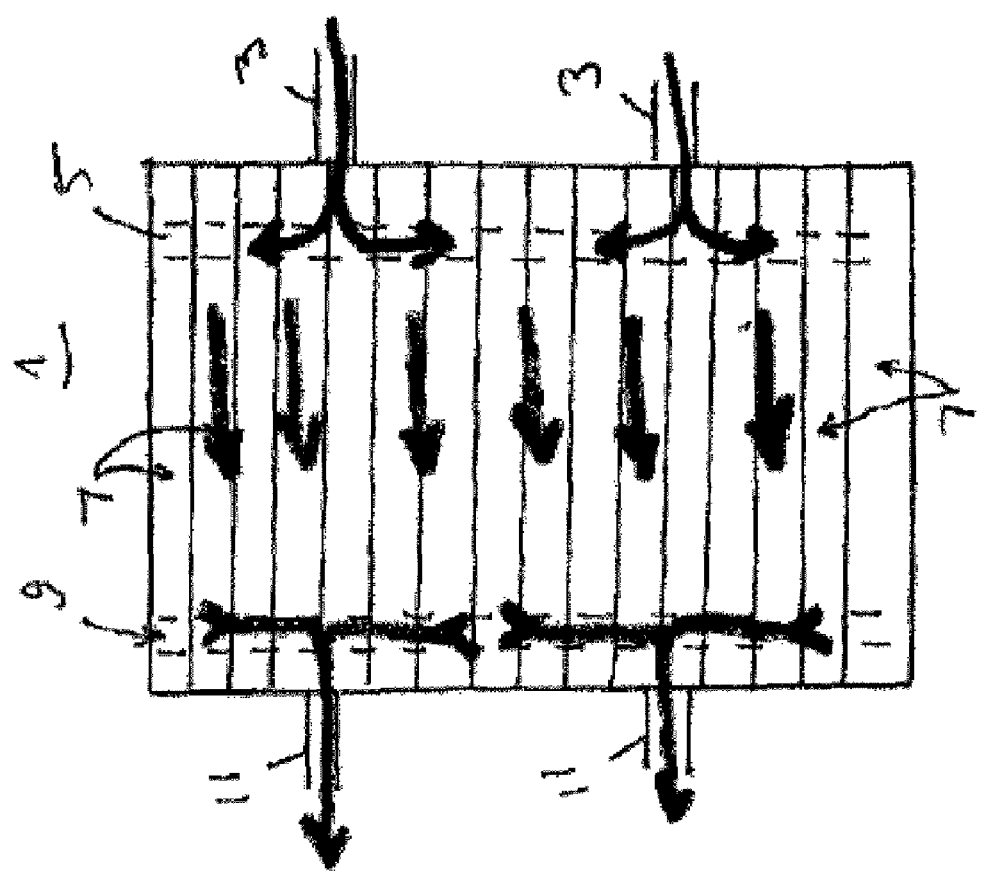
FIG. 1 is a schematic side cross sectional view of a stack of one embodiment of the present invention.

FIG. 1 is a schematic illustration of a fuel cell stack 1 of a first embodiment of the invention containing a plurality of fuel delivery or inlet ports 3. While two ports 3 are shown in FIG. 1 for clarity, it should be understood that more than two ports 3, such as three to ten ports, for example, may be provided. The fuel provided through the ports 3 circulates through fuel inlet riser openings 5 into the fuel cells 7 and then exits the fuel cells 7 through fuel outlet riser openings 9. The fuel exhaust is provided into fuel outlet ports 11 from the outlet riser openings 9. Preferably, the stack 1 contains a plurality of fuel outlet ports 11, such as two or more such ports.

The fuel inlet riser openings 5 and the fuel outlet riser openings 9 comprise openings or holes which extend through at least one layer of the fuel cells 7. For example, for electrolyte supported fuel cells, the openings 5 and 9 extend at least through the electrolyte. For electrode supported fuel cells, such as anode or cathode supported fuel cells, the openings 5 and 9 extend at least through the supporting electrode. Of course the openings 5, 9 may extend through two or more layers of the fuel cells as well as through the interconnects/gas separators which are located between adjacent fuel cells. Preferably, the fuel riser inlet 5 and outlet 9 openings have a cross sectional width of about 0.5 inches or less, such as 0.15 to 0.5 inches, for example 0.25 to 0.4 inches. For example, the openings 5, 9 may comprise openings having a round cross sectional shape and having a diameter of 0.15 to 0.5 inches. However, the openings 5, 9 may have other cross sectional shapes, such as polygonal, oval, or other suitable shapes.

Each of the plurality of fuel delivery ports 3 is positioned in the fuel cell stack 1 to provide fuel to a portion of the plurality fuel cells 7 in or on each stack. In other words, the fuel delivery ports 3 may be located "on" the stack 1 by being connected to fuel manifolds which are located between the fuel cells or the fuel delivery ports 3 may be located "in" the stack 1 by being directly connected to fuel inlet riser openings 5 in the stack 5. The fuel from each fuel delivery port 3 is preferably provided to less than all fuel cells 7 in the stack 1. However, it should be noted that the term "provide fuel to a portion of the plurality fuel cells" does not necessarily exclude allowing the fuel from a particular port 3 from circulating through the entire stack 1, with the other port(s) 3 providing supplemental fuel in other portions of the stack 1.

As noted above, the stack I is internally manifolded for fuel. Thus, fuel is distributed to each fuel cell 7 using riser openings 5, 9 contained within the stack 1. The stack 1 may be internally or externally manifolded for oxidizer, such as air. Preferably, the stack 1 is externally manifolded for oxidizer, Thus, the stack 1 is open on the air inlet and outlet sides, and the air is introduced and collected independently of the stack hardware.

The stack 1 may comprise any suitable shape. Preferably, the stack 1 comprises a planar type stack containing plate shaped (i.e., planar) fuel cells 7, The stack may be positioned in any suitable direction from vertical to horizontal. Preferably, the stack is positioned vertically, with each fuel cell being located over the adjacent fuel cell below. The fuel delivery ports 3 and the fuel outlet ports 11 may be positioned periodically up the stack 1, as shown in FIG. 1.

Preferably, the fuel cells 7 comprise solid oxide fuel cells. However, the fuel cells may comprise other fuel cell types, such as molten carbonate fuel cells, for example. Any suitable fuel may be provided into the fuel cells. For example, hydrogen and/or hydrocarbon fuel, such as methane or natural gas, may be provided into the fuel cells.

Figure 2:
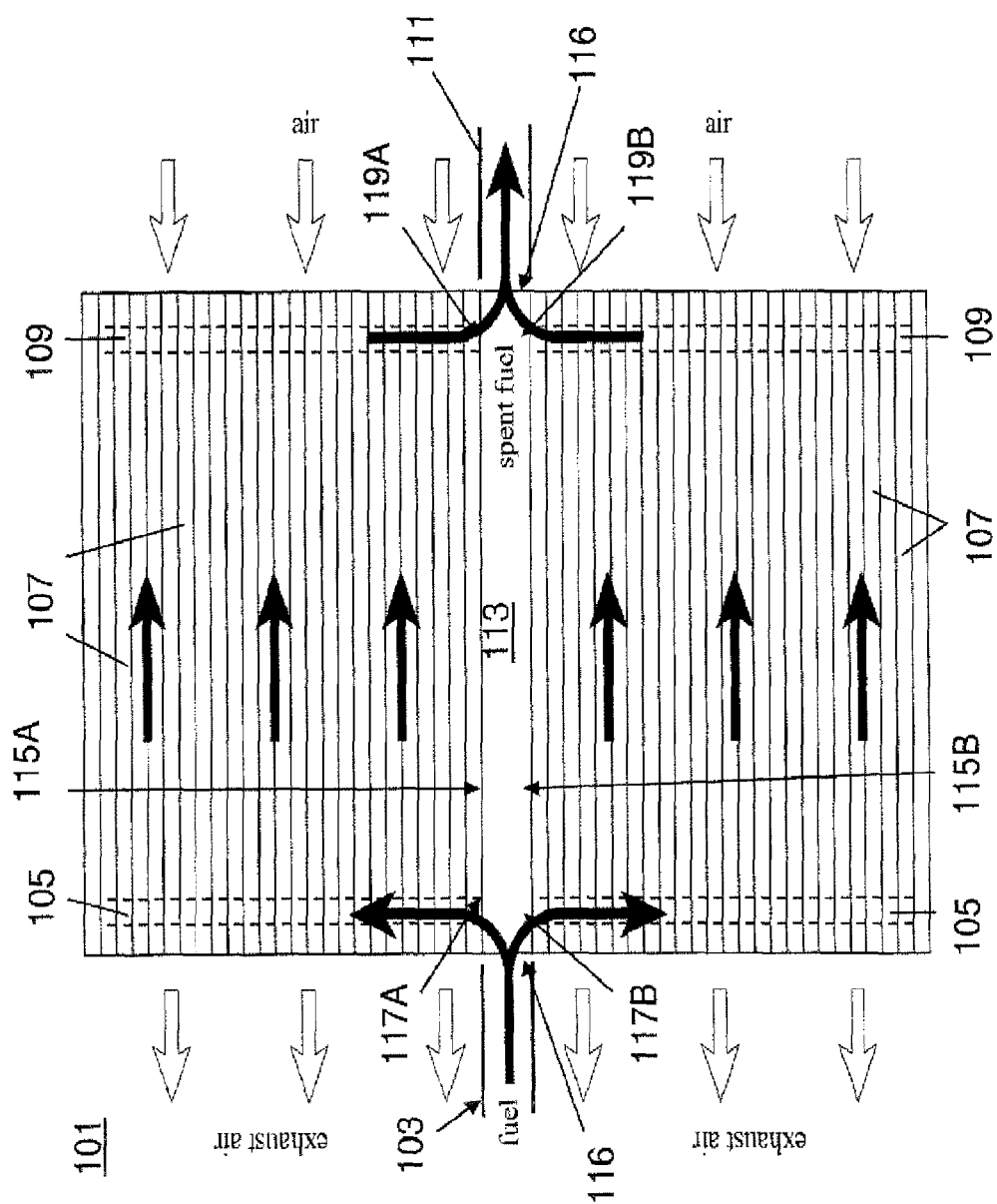
FIG. 2 is a schematic side cross sectional view of a stack of another embodiment of the present invention.

FIG. 2 shows a side cross sectional view of a fuel cell stack 101 according to a second embodiment of the invention. In the stack 101, at least one fuel delivery port 103 is connected to a fuel manifold 113 located between adjacent plate shaped fuel cells 107. In one example, the stack 103 contains a plurality of fuel delivery ports 103 and a plurality of fuel outlet ports 111 as described with respect to the first embodiment above. The stack 103 also contains a plurality of fuel manifolds 113, such that each of the plurality of fuel delivery ports 103 is connected to a respective one of a plurality of fuel manifolds 113. The stack 103 comprises a complete and independent electrical entity.

In another example, the stack 103 contains only one fuel manifold 113 which is located between adjacent plate shaped fuel cells 107. In other words, the fuel manifold 113 is located between the fuel cells 107 in the stack rather than at the edge of the stack between the last (i.e., edge) fuel cell in the stack and an end plate of the stack.

Figure 3:
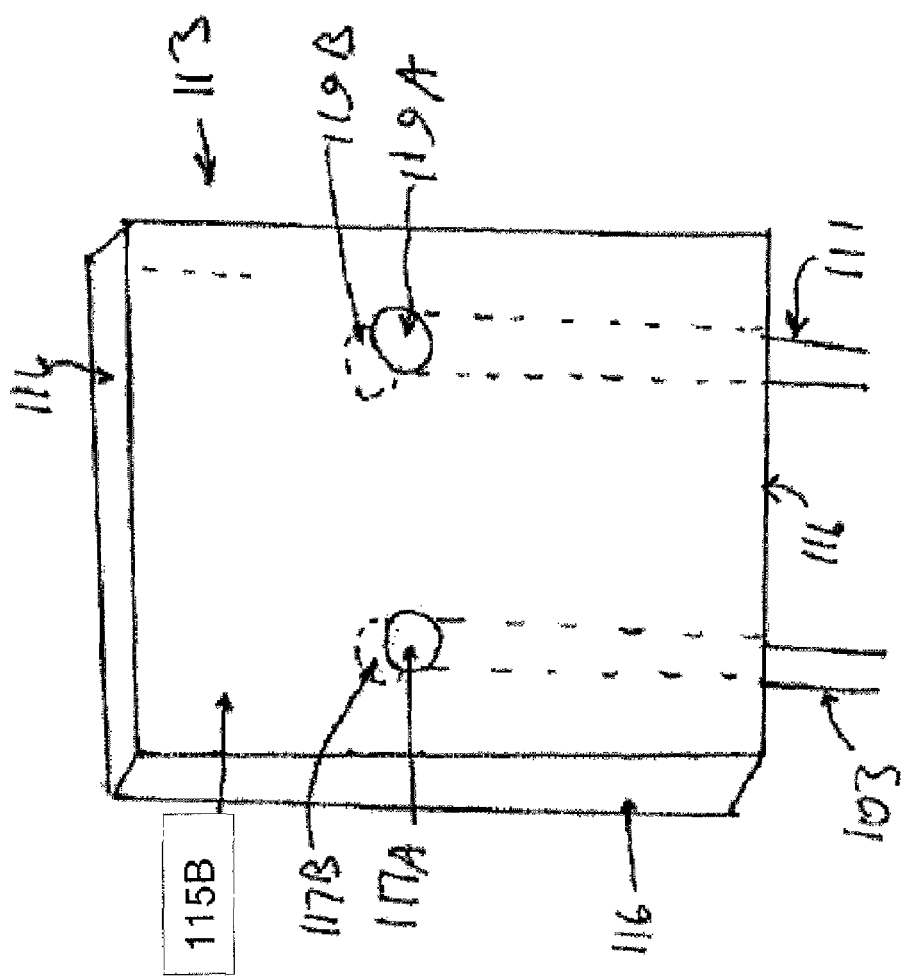
FIG. 3 is a schematic three dimensional view of a fuel manifold shown in FIG. 2.

The fuel manifold 113 may have any suitable configuration, such as a pipe or chamber configuration. For example, as shown in FIG. 3, the fuel manifold may comprise a chamber configured as a plate shaped box. The box may have any suitable cross sectional shape, preferably a shape which matches the cross sectional shape of the fuel cells. For example, the cross sectional shape of the fuel manifold may comprise a polygon, such as a triangle, rectangle, square, etc., a circle, an oval or other suitable shape. The plate shaped box 113 contains major surfaces 115 or faces and narrower edge surfaces 116.

The box 113 contains at least one fuel delivery opening 117 in fluid communication with fuel cell fuel inlet riser openings 105 and at least one fuel outlet opening 119 in fluid communication with fuel cell fuel outlet riser openings 109. For example, as shown in FIGS. 2 and 3, a first fuel delivery opening 117A and a first fuel outlet opening 119A are located in a first major plate face 115A of the plate shaped box, and a second fuel delivery opening 117B and a second fuel outlet opening 119B are located in a second major plate face 115B of the plate shaped box 113. The fuel manifold 113 also contains a fuel delivery port 103 comprising a fuel inlet conduit adapted to provide a fuel inlet stream into the fuel manifold 113. The fuel manifold 113 also contains a fuel outlet port 111 comprising a fuel outlet conduit adapted to remove a spent fuel outlet or exhaust stream from the fuel manifold 113. Preferably, the fuel inlet and outlet conduits 103, 111 are located non-parallel with the fuel inlet 105 and outlet 109 riser openings. For example, as shown in FIGS. 2 and 3, the fuel inlet and outlet conduits 103, 111 are located perpendicular to the fuel inlet 105 and outlet 109 riser openings (i.e., the fuel inlet and outlet conduits 103, 111 are located perpendicular to the direction in which fuel inlet 105 and outlet 109 riser openings extend).

As shown in FIG. 2, the fuel manifold 113 introduces fresh fuel from fuel inlet port 103 into the fuel inlet riser openings 105 through fuel delivery openings 117A and 117B. The fuel flows from the fuel inlet riser openings 105 through the fuel cells 107 (i.e., through fuel flow channels between the fuel (anode) electrodes and the gas separator/interconnect plates) and into the fuel outlet riser openings 109. The spent or exhausted fuel (i.e., fuel exhaust) is provided from the fuel outlet riser openings 109 into the fuel outlet openings 119A and 119B of the fuel manifold. The exhausted fuel is then removed from the stack 101 via the fuel outlet port 111. In the vertically positioned stack 101, the fuel flows up and down to and from the manifold 113 through openings 105 and 109. However, if the stack 101 is positioned horizontally, then the fuel would flow in horizontal planes through openings 105, 109, FIG. 2 also shows the oxidizer (i.e., air) flow in the fuel cell stack 101 that has an external manifolding configuration on the oxidizer side. The oxidizer (i.e., air) is provided from one side of the stack 103, travels through the fuel cells 107 (i.e., between the oxidizer (cathode) electrodes and gas separator/interconnect plates) and exits on the opposite side of the stack 103. In solid oxide fuel cells, a portion of the oxidizer (i.e., oxygen present in air) is transported through the fuel cell electrolyte in the form of oxygen ions and reacts with the fuel to generate the fuel exhaust, such as water. FIG. 2 shows a flow configuration where fuel and air flow in parallel but opposite directions along the fuel cells 107. However, fuel and air may flow in parallel and same direction, or in perpendicular directions if desired. Furthermore, as noted above, the stack 10 may instead have an internal manifolding configuration on the air side.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application It is intended that the scope of the invention be defined by the claims appended hereto, and their equivalents.

What is claimed is:

1. A fuel cell stack located within a manifold housing, the fuel cell stack comprising:

a plurality of plate shaped fuel cells which are internally manifolded on a fuel side and externally manifolded on an oxidizer side such that oxidizer is provided from a first side of the fuel cell stack for each of the plurality of plate shaped fuel cells through a respective inlet in the first side of the fuel cell stack, travels between a cathode electrode of each of the plurality of plate shaped fuel cells and an adjacent interconnect plate, and exits through a respective outlet on a second side of the stack, wherein the respective inlets and outlets are exposed to, and communicate with, the inside of the manifold housing; and at least one fuel manifold located between adjacent fuel cells;

wherein the at least one manifold comprises:

a plate shaped box comprising at least one fuel delivery opening in fluid communication with fuel cell fuel inlet riser openings and at least one fuel outlet opening in fluid communication with fuel cell fuel outlet riser openings;

a fuel delivery port comprising a fuel inlet conduit adapted to provide a fuel inlet stream into the fuel manifold, and a fuel outlet port comprising a fuel outlet conduit adapted to remove a fuel outlet stream from the fuel manifold; and wherein the plate shaped box comprises a separate component from the fuel cells.

2. The stack of claim 1, wherein the fuel inlet and outlet riser openings are positioned substantially perpendicularly to the fuel inlet and the fuel outlet conduits.

3. The stack of claim 2, wherein:

the at least one fuel manifold comprises a first fuel delivery opening and a first fuel outlet opening located in a first major plate face of the plate shaped box, and a second fuel delivery opening and a second fuel outlet opening located in a second major plate face of the plate shaped box; and the fuel inlet conduit and the fuel outlet conduit are connected to at least one edge of the plate shaped box.

4. The stack of claim 1, further comprising fuel inlet riser openings in the plurality of fuel cells having a cross sectional width of 0.15 to 0.5 inches.

5. The stack of claim 1, further comprising a plurality of fuel delivery ports, wherein each of the plurality of fuel delivery ports is connected to a respective one of a plurality of manifolds to provide fuel to a portion of the plurality fuel cells in each stack.

6. The stack of claim 1, wherein the plurality of plate shaped fuel cells are stacked in a vertical direction.

7. The stack of claim 6, wherein the plate shaped box comprises:

a top wall, a bottom wall, two opposite end walls, and two opposite side walls, said end walls and said side walls extending upwardly from the bottom wall to the top wall, wherein said side walls and end walls comprise edge surfaces, and wherein said top and bottom walls comprise first and second major plate surfaces of the plate shaped box.

8. A fuel cell stack located within a manifold housing, the fuel cell stack comprising:

a plurality of plate shaped fuel cells which are internally manifolded on a fuel side and externally manifolded on an oxidizer side such that oxidizer is provided from a first side of the fuel cell stack for each of the plurality of plate shaped fuel cells through a respective inlet in the first side of the fuel cell stack, travels between a cathode electrode of each of the plurality of plate shaped fuel cells and an adjacent interconnect plate, and exits through a respective outlet on a second side of the stack, wherein the respective inlets and outlets are exposed to, and communicate with, the inside of the manifold housing; and at least one fuel manifold located between adjacent fuel cells;

wherein the at least one manifold comprises:

a plate shaped box comprising at least one fuel delivery opening in fluid communication with fuel cell fuel inlet riser openings and at least one fuel outlet opening in fluid communication with fuel cell fuel outlet riser openings;

a fuel delivery port comprising a fuel inlet conduit adapted to provide a fuel inlet stream into the fuel manifold, and a fuel outlet port comprising a fuel outlet conduit adapted to remove a fuel outlet stream from the fuel manifold;

wherein the plate shaped box comprises a top wall, a bottom wall, two opposite end walls, and two opposite side walls, said end walls and said side walls extending upwardly from the bottom wall to the top wall, wherein said side walls and end walls comprise edge surfaces, wherein said top and bottom walls comprise first and second major plate surfaces of the plate shaped box, and wherein at least one of the top and the bottom walls of the plate shaped box are located adjacent to the plurality of plate shaped fuel cells.

9. The stack of claim 8, wherein the fuel inlet and outlet riser openings are positioned substantially perpendicularly to the fuel inlet and the fuel outlet conduits.

10. The stack of claim 9, wherein:

the at least one fuel manifold comprises a first fuel delivery opening and a first fuel outlet opening located in the first major plate surface of the plate shaped box, and a second fuel delivery opening and a second fuel outlet opening located in the second major plate surface of the plate shaped box; and the fuel inlet conduit and the fuel outlet conduit are connected to at least one edge surface of the plate shaped box.

11. The stack of claim 8, further comprising fuel inlet riser openings in the plurality of fuel cells having a cross sectional width of 0.15 to 0.5 inches.

12. The stack of claim 8, further comprising a plurality of fuel delivery ports, wherein each of the plurality of fuel delivery ports is connected to a respective one of a plurality of manifolds to provide fuel to a portion of the plurality fuel cells in each stack.

13. The stack of claim 8, wherein the plurality of plate shaped fuel cells are stacked in a vertical direction.

14. The stack of claim 8, wherein the plate shaped box comprises a separate component from the fuel cells.

* * * * *